United States Patent
Dunton et al.

[11] Patent Number: 5,499,441
[45] Date of Patent: Mar. 19, 1996

[54] CONTINUOUS EXTRUSION IMPREGNATION MOLDED ARTICLE PROCESS

[75] Inventors: Thomas P. Dunton, Lebanon Springs, N.Y.; Walter L. Hall, Mt. Vernon, Ind.; Erich O. Teutsch, Richmond, Mass.

[73] Assignee: General Electric Company, Pittsfield, Mass.

[21] Appl. No.: 106,092

[22] Filed: Aug. 11, 1993

[51] Int. Cl.$^6$ ........................................ B21B 1/46
[52] U.S. Cl. ................. 29/527.2; 174/35 MS; 428/256; 428/594; 428/608
[58] Field of Search ............... 29/527.2, 527.1; 174/35 MS; 428/256, 594, 608, 628

[56] References Cited

U.S. PATENT DOCUMENTS

| | | |
|---|---|---|
| 4,716,072 | 12/1987 | Kim . |
| 4,859,524 | 8/1989 | Kim et al. . |
| 4,882,114 | 11/1989 | Radvan et al. . |
| 4,983,247 | 1/1991 | Kim . |
| 5,047,198 | 9/1992 | Kim . |
| 5,226,210 | 7/1993 | Koskenmaki et al. ......... 174/35 MS |

FOREIGN PATENT DOCUMENTS

| | | |
|---|---|---|
| 174813 | 3/1986 | European Pat. Off. . |
| 0389798 | 10/1990 | European Pat. Off. . |
| 2927653 | 1/1981 | Germany . |
| 3326392 | 1/1985 | Germany . |
| 4112532 | 10/1992 | Germany . |
| 53-1274 | 1/1978 | Japan . |
| 2-220841 | 9/1990 | Japan . |
| WO-A-8700791 | 2/1987 | WIPO . |

*Primary Examiner*—Carl J. Arbes

[57] ABSTRACT

This invention is directed to a process for preparing a molded thermoplastic fiber reinforced article having on at least one surface thereof a metal film and to a mold article prepared therefrom. The process comprises applying a first thermoplastic resin to at least one surface of a fiber mat core, then applying a metal film to at least one surface of the substrate of fiber mat core and thermoplastic resin and then molding the combination thereof under heat and pressure, preferably compression molding to form the finished article. A second thermoplastic resin may be applied to at least one surface of the combination of fiber mat core and first thermoplastic resin. Either the first and/or the second thermoplastic resin may be in film or molten form. If either or both are in film form, then it is preferable that the fiber mat core be heated prior to applying the film form of thermoplastic resin or at least the combination to preferably heated prior to molding thereof. The metal employed may be preferably copper or aluminum.

12 Claims, No Drawings

CONTINUOUS EXTRUSION IMPREGNATION MOLDED ARTICLE PROCESS

FIELD OF THE INVENTION

The present invention relates to a continuous process for producing a fiber reinforced thermoplastic resin article having a metal surface on at least one side thereof and the finished article produced therefrom. The metal surface of the finished article may be any metal surface that can be applied as a film or thin layer and is, preferably, copper or aluminum.

Briefly, the continuous process of this invention comprises continuously applying a thermoplastic resin on at least one surface of a fiber mat core, applying a metal film or layer on at least one surface of the combination of fiber mat core and first thermoplastic resin, passing the combination to a molding zone, and then molding the combination thereof under heat and pressure into a finished article. The finished article has a metal surface on at least one side of the molded article but can be applied to both surfaces. The surprising feature is that the metal film or layer adheres to the substrate of fiber mat core and thermoplastic resin producing a molded article having a metal surface on at least one side thereof. The final shaped article has many applications, such as roofing tile providing a copper clad roof for example, aluminum clad siding, exterior parts of automobiles, and many other applications.

BACKGROUND OF THE INVENTION

Metal clad plastics are known in the art and have been applied by hot metal deposition, metal vaporization, etc. However, the problem of laminating metal film or a metal layer on a plastic substrate has always been a problem, and effective and economical ways of applying metal to plastic substrates has always been difficult. The present invention accomplishes this, as well as being somewhat economical, since the process can be continuous.

DETAILED DESCRIPTION OF THE INVENTION

In accordance with the present invention, there is provided a process for producing fiber reinforced thermoplastic resin articles by molding thereof, which articles comprise a fiber mat core, thermoplastic resin and a metal surface on at least one side thereof. These articles are the finished product and are not generally further converted into other products. In other words, the final article would be the roof tile, the siding, the automobile door panel, the automobile bumper, etc.

In its broadest scope, the process of this invention comprises applying a thermoplastic resin onto at least one surface of a fiber mat core, followed by applying a metal film or metal layer onto at least one surface of the combination of the fiber mat core and thermoplastic resin, then passing the combination of the fiber mat core, thermoplastic resin and metal layer to a molding zone where molding of the combination thereof occurs under heat and pressure into a molded thermoplastic resin fiber reinforced article having a metal surface on at least one side thereof. The temperature of the mold in the molding zone, preferrably compression molding, may be and is preferably below the melt temperature of the thermoplastic resins employed in this process. In the broadest embodiment of this invention, only one thermoplastic resin may be employed herein before applying the metal layer or metal film. If only one thermoplastic resin is employed, the amount so applied, either in film, molten or powdered form, should be sufficient to impregnate the fiber mat core to sufficiently bond the fibers thereof and to also provide sufficient resin on the surface of the fiber mat core for adhesion of the fiber mat core and metal film. Also, the thermoplastic resin may be in film form or it may be molten, or it may be in powdered form. However, if the resin is in film or powdered form, the fiber mat core and film must be heated to a temperature sufficient to melt the resin film or powder and for a time sufficient to heat the fiber mat core to processing temperature prior to applying the metal film or metal layer. As used herein, metal film shall mean metal film or a metal layer. Preferably, however, two thermoplastic resins are employed in the practice of this invention as subsequently described in this invention.

In a more specific embodiment of this invention, the process comprises (1) continuously applying a first thermoplastic resin film onto at least one surface of a fiber mat core, (2) heating the fiber mat core and first thermoplastic resin film to a temperature and for a time sufficient to melt the thermoplastic resin film and to also heat the fiber mat core to processing temperature, which is namely heating the fiber mat core throughout to the thermoplastic resin processing temperature of at least 350° F., (3) passing the combination to a zone wherein a second thermoplastic resin in melted form is continuously applied to at least one surface of the fiber mat core and first thermoplastic resin, preferably the second resin being applied over the first thermoplastic resin, and (4) applying to the combination a metal film to at least one side or surface thereof and then passing the combination to a molding zone wherein the combination is preferably compression molded under heat and pressure into the finished article having a metal surface on at least one side thereof. The thermoplastic resin processing temperature is preferably above the melting or softening temperature of the thermoplastic resins being employed herein.

Alternatively, in the above embodiment, the fiber mat core can be first heated to processing temperature which would be sufficient to heat the fiber mat core up to processing temperature and to melt the first thermoplastic resin film. A first thermoplastic resin film is then continuously applied to at least one surface of the heated fiber mat core, which resin film will melt from the heat of the fiber mat core. The melted resin film and heated fiber mat core is then passed to a zone wherein the second thermoplastic resin in melted form is continuously applied to at least one surface of the combination of heated fiber mat core and melted first thermoplastic resin film. This is followed by applying to the combination, a metal film and then transferring the combination to a molding zone, wherein the finished article is prepared preferably by compression molding under heat and pressure.

Other variations of the above embodiments may be employed herein such as the first thermoplastic resin can be applied in the melted state by either coating or extrusion. The second thermoplastic resin can then be applied as a film at essentially room temperature onto at least one surface of the combination of heated fiber mat core and the melted first thermoplastic resin, preferably onto the surface of the first thermoplastic resin. It may be necessary to heat the combination of fiber mat core and the first and second thermoplastic resins prior to applying the metal film if the residual heat of the heated fiber mat core and first melted thermoplastic resin is not sufficient to melt the second thermoplastic resin applied in film form or not sufficient to maintain at least the second thermoplastic resin molten prior to applying the metal film or layer. This might occur where the second resin has a higher melting or softening temperature or higher molecular weight or some cooling may have resulted prior to applying the metal or layer, or it could be a combination of any of these factors.

Additionally, as another embodiment, each thermoplastic resin, i.e. the first and second thermoplastic resin, can be applied in film form, both films of which may be applied at essentially room temperature or above room temperature, but below their melting temperatures. Employing both thermoplastic resins in film form would require heating of the fiber mat core or heating the fiber mat core and first thermoplastic resin film or heating the fiber mat core, first and second thermoplastic resin films to a temperature above the melting or softening temperature of the thermoplastic resins prior to applying the metal film.

In another embodiment of this invention, the first and/or second thermoplastic resin may be in powdered form when applied to the fiber mat core. In such an embodiment, the powdered thermoplastic resin would need to be melted either from the heated fiber mat core or subsequently, but prior to molding.

Other combinations may and will become obvious to those skilled in the art. The first thermoplastic resin and/or the second thermoplastic resin, may be applied in film or powdered form, at least at about room temperature, but can be applied at an elevated temperature, but below the melting temperature of the resin. Alternatively, both resins may be applied in the melted form, or one resin may be applied in the film form and the other resin may be applied in the melted form. Whenever a thermoplastic resin in film form is employed, it must be heated at some stage in the process in order to melt the resin prior to molding or at least prior to applying the metal film. In addition, the first thermoplastic resin is so formulated, i.e. molecular weight or intrinsic viscosity, etc., to impregnate the fiber mat core. This is commonly known as "wet-out" of the fibers in order to provide bonding of the fibers of the fiber mat core. This bonding of the fibers of the fiber mat core is in addition to the binder resins or agents used by the fiber manufacturers during manufacturing of the fiber mat. A binder resin or agent is generally used in an amount to sufficiently hold the fibers together so as to provide body to the fiber mat for handling purposes. The binder resin or agent should be comparable with the thermoplastic resins being employed in the practice of this invention and preferably aides in "wetting-out" of the fibers of the fiber mat core with the thermoplastic resin used in impregnating the fiber mat core. This procedure is well known to the fiber mat manufacturers. In addition, it is preferable to heat the metal film to a temperature above the processing temperature of the thermoplastic resins.

Also, in the process of this invention, an adhesive layer may be employed between the resin surface of the fiber mat core and metal film, when a second thermoplastic resin is employed, or between the fiber mat core and metal film if only the first thermoplastic resin is employed. The adhesive layer may be a resin film layer or it may be powdered thermoplastic resin, such as polybutylene terephthalate or polyethylene terephthalate or a blend thereof. If a second thermoplastic resin is employed, generally, an adhesive layer may not be necessary, since bonding can occur between the metal film and the second thermoplastic resin.

In the molding zone, there is sufficient residual heat in the fiber mat to maintain at least the first thermoplastic resin molten during molding such that the molding pressure will force the first thermoplastic resin, which has now been melted or is in the molten state, into the fiber mat, thereby wetting or coating the fibers thereof. Also, during molding when employing a second thermoplastic resin which has also been melted or is in the molten state and which may be on the top and/or bottom of the fiber mat core, it will essentially remain on of at the surface of the fiber mat core after impregnation of the fiber mat core with the first thermoplastic resin. It is preferable that when employing a second thermoplastic resin that it be applied onto the first thermoplastic resin. This also provides bonding of the metal film to the fiber mat core, which metal film is preferably applied to the side of the fiber mat core having the second thermoplastic resin thereon. During molding, the temperature of the mold may be below the melt temperature of the second thermoplastic resin extruded onto the fiber mat core, thereby chilling or solidifying the second thermoplastic resin on the surface of the resin impregnated fiber mat core, but not enough to chill the first thermoplastic resin before it impregnates the fiber mat core. Preferably, molding is by compression molding. However, disclosed hereinafter is another molding process referred to as "roll forming" which may, in effect, be considered a form of compression molding.

In the practice of this invention, it may be desirable to employ a low molecular weight or a low viscosity first thermoplastic resin for imprenating the fiber mat core because of the ease of flow of the resin. The second thermoplastic resin may be of a higher molecular weight or a higher viscosity resin which would minimize penetration of the second thermoplastic resin into the fiber mat core.

Alternatively, in another embodiment of the process of this invention, a "wet-out" roll zone may be employed to impregnate the fiber mat core with the first thermoplastic resin between the zone where the first thermoplastic resin is applied to the fiber mat core and the zone where the second thermoplastic resin is applied but prior to applying the metal layer. The "wet-out" roll zone can consist of at least one pair of opposing heated "wet-out" rolls, the surfaces of which are heated to a temperature sufficiently low enough to avoid sticking of the melted resin film or molten first thermoplastic resin to the surface of the rolls, but yet high enough to avoid excessive chilling of the first thermoplastic resin. Some chilling of the surface interface of the melted resin and the roll surface may occur, but the temperature of the surface of the rolls should not be so low as to cause excessive chilling at the interface of the resin surface and the roll surface, which would tend to lessen the impregnation of the fiber mat core with the first melted resin film or molten thermoplastic resin. Although some momentary chilling of the resin surface may occur, as stated above, the residual heat in the fiber mat core should be sufficient to remelt the chilled surface of the resin, thereby aiding the impregnation of the fiber mat core therewith. The pressure of the rolls on the first melted thermoplastic resin coated fiber mat core and the nip of the rolls should be such as to force the thermoplastic resin into the fiber mat core, namely impregnate the fiber mat core, but not so great as to fracture the fibers of the fiber mat core. As stated previously, this is known as "wet-out" of the fibers; thus the term "wet-out" rolls. Also, the speed of the fiber mat core and of the rolls can be so adjusted that excessive chilling would be avoided even if low temperature heated rolls are used.

As stated earlier, alternatively, at least one pair of opposing "wet-out" rolls can be used. However, the number of pairs of rolls used can vary depending on the thickness of the fiber mat core, the speed of the fiber mat layer through the continuous process of this invention and/or the melt viscosities of the thermoplastic resins employed. One could use two or three or more pairs of opposing "wet-out" rolls depending on the above factors.

In addition, if "wet out" rolls are employed, the rolls may also be shaping rolls in that the surface of the rolls are so designed and manufactured so as to conform to the desired shape of the final article. This is known as "roll" forming. Thus, the fiber mat core will then take the shape of the contoured rolls as the combination of the first thermoplastic resin and the fiber mat core passes therebetween, as well as impregnating the fiber mat core with the first thermoplastic resin. Then, the second thermoplastic resin is applied onto the surface of the heated preshaped resin impregnated fiber mat, followed by applying the metal film. The combination is then compression molded into the final or finished formed article, which is the same configuration as obtained from the preforming operation during roll forming. However, "roll" forming may be sufficient to form the final article without actually advancing the combination of preformed fiber mat core and thermoplastic resin to a molding zone. The "roll" forming would, in effect, be a compressing molding step as well. However, prior to roll forming the final article, the metal film, would need to be applied to the surface or surfaces of the fiber mat core and first and/or second thermoplastic resin combination. Depending on the configuration of the shape of the final article, the thickness of the metal film would need to be such as to easily mate with the fiber mat core and thermoplastic resin. For example, a channel beam could be so made continuously or slabs such as plastic roof tile or siding for buildings could be continuously so formed by "roll" forming.

If "wet-out" rolls are employed, the fiber mat core may become somewhat compressed as it passes through the nip of the "wet-out" rolls. However, the fiber mat core, as it leaves the "wet-out" roll zone expands, commonly known as "lofting" which may be due to the residual heat in the fiber mat and the latent recoil forces within the fibers. The fiber mat core is porous in that it contains voids or openings in the fiber mat core, even though it becomes impregnated with the first thermoplastic resin. Even as the fiber mat layer leaves the zone where a second thermoplastic resin is applied, if a second thermoplastic resin is employed, the structure is still porous in that the structure contains pores, voids or openings. Upon molding thereof, the structure may be non-porous depending on the fiber content as stated subsequently herein.

The fiber mat core after the first thermoplastic resin is applied is porous in that it contains voids or openings in the structure and remains as such until it is molded. Upon molding or "roll" forming of the fiber mat core, thermoplastic resins and metal film into the final shape, it may become a non-porous article essentially free of voids or openings. However, the question of the final article being essentially non-porous depends upon the fiber content of the final article to be prepared by the process of this invention. If the fiber content is high, the final article, while being impervious to air or water, would be classified as porous in that it would contain openings or voids within the core of the final article after molding. Obviously, the surface or surfaces would be free of voids or openings and would be non-porous. On the other hand, if the fiber content is low, the core would be essentially non-porous upon molding.

The fiber mat employed in the practice of this invention preferably consists of glass fibers of about ¼" to about 2" long and may have a nominal length of about ½". Generally, glass fibers are the preferred fibers, but other fibers are combinations of fibers may be employed and used such as carbon fibers, mineral fibers, high temperature organic fibers, etc. The fibers employed in preparing the fiber mat of this invention are high aspect ratio fibers, wherein the ratio of length to diameter or thickness ratio is greater than 1 and preferably 10 or greater. If the end product is to be employed for electrical uses, it may be preferred to use fibrous glass filaments comprised of lime-aluminum borosilicate glass that is relatively soda free this is known as "E" glass. However, other glasses are useful such as the low soda glass known as "C" glass where electrical properties are not so important. Also useful are the "S" glasses. The glass filaments are made by standard processes, e.g., by steam or air blowing, flame blowing and mechanical pulling. Generally, the preferred method for making glass filaments for plastic reinforcement is the mechanical pulling process. The filament diameters range from about 5 microns μm) to about 30 microns (μm) and may even be finer, but this is not critical to the present invention.

While chopped glass fibers have been described above, other glass fibers can be used to make up the fiber mat core such as continuous random glass fibers or a combination of chopped glass fibers and continuous random glass fibers may be employed herein or any combination thereof with other forms of the glass fibers or other fibers. The preferred fiber mat is one made up of chopped glass fibers as described previously. The glass fibers in the fiber mat core may be essentially fully dispersed glass fibers or may contain bundles of glass fibers or a combination of both, depending on the end use of the article being so formed.

The number of layers of fiber mats employed in the practice of this invention is at least one layer. However, more than one layer may be employed such as two or three or more layers of fiber mat, depending on the desired thickness of the ultimate article being molded. In addition, the thickness of the fiber mat layer can vary depending on the parameters of the end use of the composite as stated above. Regardless of the number of layers of fiber mat employed, the fiber mat core may be coated with the first thermoplastic resin on at least one surface thereof, but may be coated on both outer surfaces. If more than one fiber mat layer is employed, the first thermoplastic resin may be applied on the outer surfaces, as well as between surface or surfaces of fiber mat layers. Again, where the first thermoplastic resin is deposited depends on the parameters of the process of this invention, the speed of the process, the melt viscosity of the first thermoplastic resin used for impregnation the fiber mat and/or the desired shape of the finished article. However, the fiber mat core must be brought up to the processing temperature of the thermoplastic resin or resins, as the case may, which temperature is above the softening or melting temperature of the resins employed in the practice of this invention.

The thermoplastic resins that can be used in the present invention may be any of the thermoplastic resins and depends primarily on the end application of the molded part or article. The thermoplastic resins that may be employed as the first resin and/or as the second resin may be the same or different and may be, for example, an aromatic polycarbonate having an intrinsic viscosity of about at least 0.40 deciliters/gram as measured in methylene chloride at 25° C., polyethylene (PE), polystyrene, copolymers and terepolymers of styrene copolymerized with other monomers such as acryo-lonitrile, butadiene, methymethacrylate, ethylmethacrylate, ethyl methylmethacrylate, etc., high impact polystyrene which is a polybutadiene with styrene monomer polymerized thereon, polybutylene terephthalate, polyethylene terephthalate, blends of polybutylene terephthalate (PBT) and polyethylene terephthale (PET), polypropylene, polypropylene terephthalate (PPT), poly(1,4 cyclo-hexanedimethanol) terephthalate, polyetherimide, polyetherimide esters, polyether, polyether ester, polyphenylene ether (PPE), crystalline or amorphous polyamides (PA), blends of polyphenylene ether and styrene polymers such as polystyrene or high impact polystyrene, etc., or blends of any of the above thermoplastic resins. The first thermoplastic resin and the second thermoplastic resin, as stated previously, may be the same or different resins, may be of the same or different melt viscosities, or may be of the same or different molecular weights. If the thermoplastic resins are to be each an aromatic polycarbonate resin for example, it is preferred that the first thermoplastic polycarbonate have an intrinsic viscosity of less than about 0.5 dl/g and the second thermoplastic polycarbonate have an intrinsic viscosity of greater than about 0.5 dl/g. Another combination is using as the first thermoplastic resin a blend of polyphenylene ether and a high impact polystyrene (NORYL® resin sold by General Electric Company), and as the second thermoplastic resin an aromatic polycarbonate (LEXAN® 100 resin sold by General Electric Company having an intrinsic viscosity (IV) of about 0.55 deciliters/gram as determined in methylene chloride at 25° C.). Yet another system that can be successfully employed is a combination wherein the first and second thermoplastic resins are a blend of an aromatic polycarbonate, polybutylene terephthalate and an impact modifier (XENOY® resin sold by General Electric Company). Various other combinations of resin systems can be employed in the practice of this invention such as those listed below:

| First Resin | Second Resin |
| --- | --- |
| • Polycarbonate (IV 0.48 dl/gram) | XENOY ® resin |
| • NORYL ® resin | NORYL ® resin |
| • VALOX ® 295 resin (polybutylene terephthalate [PBT] IV 0.50 dl/g as determined in a 60:40 phenol/tetrachloroethane at 23°–30° C.) | VALOX ® 315 resin (same, but IV 0.7 dl/g) |
| • PBT/PET (50 wt. %/50 wt. % IV 0.45 dl/g) | Polycarbonate (IV 0.55 dl/g) |
| • NORYL ® resin | PPE/PA (70 wt. %/30 wt. %) |
| • PA | PA |
| • PET | PET |
| • PA (6,6) | PPE/PA (70 wt. %/30 wt. %) |
| • PPE/PBT | NORYL ® resin |
| • PPE/PET | NORYL ® resin |
| • PPE/PET | PPE/PET |
| • PPE/PET/PBT | NORYL ® resin |
| • NORYL ® resin | PPE/PET/PBT |

In addition, one employing polyethylene terephthalate (PET) alone that is either the fiber mat core impregnating resin (the first thermoplastic resin) and/or the surface resin (the second thermoplastic resin), nucleating agents can be employed which enhance the molding of the article of this invention. Polyethylene terephthalate resin is generally a difficult moldable resin, and the use of a nucleating agent enhances the faster crystallization of the resin. The greater the degree of crystallization of the PET, the better are its properties in the molded state such as heat distortion temperature, melting temperature and other properties.

Many other combinations of thermoplastic resin may be employed in the practice of this invention without detracting from the scope or objective of the invention. The compositions of the VALOX®, XENOY®, NORYL®, and LEXAN® resins are as previously described.

The metal film is generally a thin gauge metal film that can easily be applied, particularly to a moving belt system. In order to ensure good contact of the metal film with the fiber mat core and thermoplastic resin, a pair of opposing heated rolls could be employed where the combination of fiber mat core, thermoplastic resin and metal film are passed therebetween. If "wet-out" rolls are employed, they may possibly be employed to ensure contact of the metal film to the fiber mat core and thermoplastic resin. The metal film that may be employed herein may be any of the metals that can be in film or thin gauge form such as one mil to upward of 40–50 mils in thickness and more and are ductile for forming, depending on the end product being formed. However, the thickness of the film need only be limited by the handling characteristics thereof. If heavier gauge metal films can be handled, particularly in a continuous process, the gauge should not be a limiting factor with respect to the scope of this invention. Typical metal films are copper, aluminum, zinc, brass, bronze, turn metal, stainless, galvanized, lead, tin, or any metal alloy having sufficient ductility for forming.

The molds employed in the present invention are compression molding molds or "roll" forming "molds" as described previously. In the case of the compression molds, the inner surface of the mold may be metal surfaces, or one surface may be metal and the other surface may be a silicone rubber surface or a hard rubber surface or a cross-linked butadiene rubber surface, or it may be a flexible diaphragm surface with a controlled heated hydraulic fluid backing. The molding process with a mold surface other than metal is known as soft surface molding wherein such surface is deformable. This molding technique is being used successfully. When using hydraulic fluid backing and a soft silicone rubber surface or flexible diaphragm, the temperature of the hydraulic fluid can be controlled to match the cooling rate of the surface of the article which is against a metal surface, whereas the other surface of the article is against the silicone rubber surface. Alternatively, very high cooling rates can be achieved or the temperature of the hydraulic fluid can be changed rapidly which would permit preheating the rubber or soft surface to prevent premature cooling of the resin surface of the article being formed during molding, followed by rapid cooling to minimize cooling/cycle time. It is preferable that full compression of the fiber mat core and resin during molding occur in order to achieve certain optimum mechanical properties of the final article prepared in accordance with this invention.

In the case of roll forming, the same applies as above with compression molding in that the roll surfaces may be either all metal or all flexible (rubber surfaces), or one surface metal and the opposing roll surface flexible. However, in roll forming, it is preferable that at least one roll surface be flexible.

While it is preferable to apply the second thermoplastic resin on both surfaces of the fiber mat core, just one surface thereof may have the first and second (if employed) thermoplastic resin applied thereon. This, however, depends on the thickness of the fiber mat core in the final molded article or the thickness of the resin layer versus the thickness of the molded article with the metal surface. It may also depend on the end use or application of the article as whether the second thermoplastic resin is applied to one or both sides of the fiber core prior to applying the metal film.

Articles produced in accordance with the present invention, wherein the article has a metal thereon, has numerous applications, as stated previously. The metal clad surface provides protection of the substrate from ultra violet light attack and thermal radiation. It also provides stiffness to the article, as well as chemical resistance, durability and esthetics.

Therefore, in the present invention, it is to be understood by those skilled in the art that various changes may be made in the particular embodiments described above without departing from the spirit and scope of the invention as defined in the appended claims.

What is claimed is:

1. A continuous process for producing a molded thermoplastic resin fiber reinforced article comprising a fiber mat core, a thermoplastic resin and a metal surface on at least one side thereof, which comprises continuously applying a thermoplastic resin, said thermoplastic resin being in molten form, in film form or in powder form, onto at least one surface of the fiber mat core, applying a metal film onto at least one surface of the fiber mat core, provided that, if the thermoplastic resin is applied in film or powder form, the fiber mat core and thermoplastic resin are heated to a temperature effective to melt the thermoplastic resin prior to applying the metal film, passing the combination of fiber mat core, thermoplastic resin and metal film to a molding zone and then molding the combination thereof under pressure and heat into a molded thermoplastic resin fiber reinforced article having a metal surface on at least one side thereof.

2. The process of claim 1 comprising continuously applying a second thermoplastic resin on at least one surface of the combination of fiber mat core and first thermoplastic resin, then applying the metal film, and then molding the combination of fiber mat core, first and second thermoplastic resin and metal film into the fiber reinforced article.

3. The process of claim 2 wherein the second thermoplastic resin is applied in the melted form.

4. The process of claim 2 wherein the first thermoplastic resin is applied in film form and then heated to a temperature sufficient to melt the first thermoplastic resin film and to heat the fiber mat core to processing temperature, which processing temperature is above the melting temperature of the thermoplastic resin.

5. The process of claim 1 wherein after applying the thermoplastic resin to at least one side of the fiber mat core but prior to applying the metal film, an adhesive layer is applied to the side of the combination of fiber mat core and thermoplastic resin to which the metal film. is to be applied.

6. The process of claim 5 wherein the adhesive layer is polybutylene terephthalate in melted form.

7. A continuous process for producing a molded thermoplastic resin fiber reinforced article comprising a fiber mat core, a thermoplastic resin and a metal surface on at least one side thereof, which comprises continuously applying a first thermoplastic resin onto at last one surface of the fiber mat core, wherein the first thermoplastic resin is a film of an aromatic polycarbonate resin having an intrinsic viscosity of less than about 0.5 dl/gram, continuously applying a second thermoplastic resin onto at least one surface of the fiber mat core and first thermoplastic resin, wherein the second thermoplastic resin is a melted aromatic polycarbonate resin having an intrinsic viscosity greater than about 0.5 dl/gram, applying a metal film onto at least one surface of the fiber mat core, passing the combination of fiber mat core, first and second thermoplastic resins and metal film to a molding zone and then molding the combination fiber mat core, first and second thermoplastic resins and metal film under pressure and heat into a molded thermoplastic resin fiber reinforced article having a metal surface on at least one side thereof.

8. The process of claim 7 wherein the heated fiber mat core and melted aromatic polycarbonate film are passed through the nip of at least one pair of opposing heated wet-out rolls under sufficient pressure to impregnate the fiber mat core with the melted aromatic polycarbonate resin film.

9. A continuous process for producify a molded thermoplastic fiber reinforced article comprising a fiber mat, a thermoplastic resin and a metal surface on at least one side thereof, which process consists essentially of:

applying a first thermoplastic resin film onto at least one surface of a fiber mat core, heating the fiber mat core and thermoplastic resin film to a temperature sufficient to melt the thermoplastic resin film and to heat the fiber mat core to processing temperature, which processing temperature is above the melting temperature of the thermoplastic resin, passing the heated fiber mat core and melted thermoplastic resin film to a zone wherein a second thermoplastic resin film is applied to at least one surface of the fiber mat core and melted first thermoplastic resin film, passing the combination thereof to a molding zone wherein a metal film is applied to at least one side of the combination of fiber mat core and thermoplastic resins, and molding the combination thereof under heat and pressure to form the thermoplastic resin fiber reinforced article having a metal surface at least one side thereof.

10. The process of claim 9 wherein the first thermoplastic resin film is applied to both the top and bottom surface of the fiber mat core.

11. The process of claim 9 wherein the fiber mat core having the first thermoplastic resin film applied onto at least one surface of the fiber mat core is passed after heating between at least two opposing heated wet-out rolls, wherein the temperature of the surface of the rolls are such as to avoid sticking of the melted first thermoplastic resin to the surface of the rolls and wherein the pressure of the rolls on the fiber mat core and melted first thermoplastic resin is sufficient to force said thermoplastic resin into the fiber mat core in order to coat the fiber surfaces thereof.

12. The process of claim 11 wherein the fiber core consists of chopped glass fibers of about ⅛" to about 2" in length.

* * * * *